Sept. 3, 1968  K. ÖSTEN INGVAR ANDERSON  3,400,289
NEUTRON DETECTOR HAVING A RADIOACTIVE VANADIUM EMITTER
Filed Feb. 3, 1966
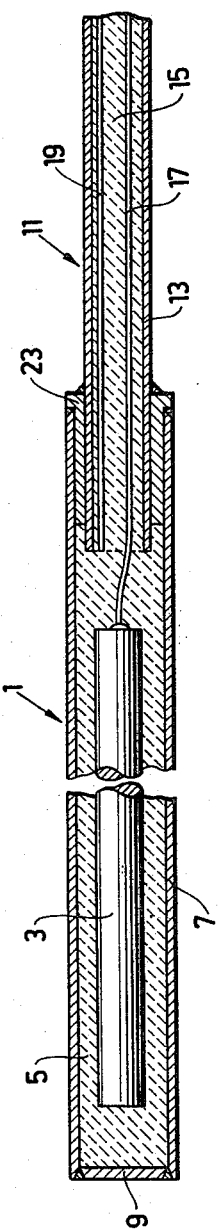
INVENTOR
Karl Östen Ingvar Andersson
BY Pierce, Scheffler & Parker
ATTORNEYS

United States Patent Office 3,400,289
Patented Sept. 3, 1968

3,400,289
NEUTRON DETECTOR HAVING A RADIOACTIVE
VANADIUM EMITTER
Karl Östen Ingvar Andersson, Nykoping, Sweden, assignor to Aktiebolaget Atomenergi, Stockholm, Sweden, a company of Sweden
Filed Feb. 3, 1966, Ser. No. 524,805
Claims priority, application Sweden, Feb. 8, 1965, 1,587/65
2 Claims. (Cl. 313—61)

ABSTRACT OF THE DISCLOSURE

A neutron detector comprises an emitter of a metal which, when neutron irradiated, gives a radioactive substance decaying by emission of beta-radiation, e.g., rhodium or silver or vanadium, and an insulating covering, e.g., of alumina or magnesia or beryllia, having a thickness of about 0.25 mm., the insulating covering being, in turn, surrounded by a collector of, e.g., stainless steel of about 0.25 mm. thickness, the beta registration producing an electric potential between the emitter and the collector.

---

The present invention relates to neutron detectors for measuring neutron flux densities by the use of $\beta$-current, and is concerned with the improvement of a detector of this type.

For measuring neutron flux within nuclear reactors it is known to use detectors comprising a $\beta$-current emitter, i.e. an element which when irradiated with neutrons is converted to a substance decaying by emission of $\beta$-radiation, a collector and an insulator between the emitter and the collector, the $\beta$-radiation producing an electric potential between said emitter and said collector. By connecting a current meter instrument between the emitter and the collector a current can directly be measured, which is proportional to the neutron flux density. However, such known detectors possess certain drawbacks in that they have a relatively low sensitivity and a comparatively low ratio between sensitivities to neutron flux and to $\gamma$-flux. Because a relatively intense $\gamma$-flux is present in the reactor core and the surroundings thereof and because one wants to know the magnitude of the neutron flux densities in different points of the reactor during the operation thereof, said ratio between the sensitivities should be as high as possible.

Materials with favorable properties for use as emitters are vanadium, rhodium and silver. These elements offer high neutron cross sections, short half-life and high energy beta radiation. The high cross section is important to obtain a detector signal which is large enough to dominate over disturbing effects. The short half-life gives the detector a fast response to changes in the neutron flux. The high beta energy is an advantage if a detector with good gamma discrimination is required.

The present invention describes a design of beta emission neutron detector where the high energy of the beta radiation is used to obtain maximum discrimination against the gamma radiation of the character that exists in nuclear reactors. According to the invention it has been found that a neutron detector with either vanadium, rhodium or silver as emitter material will have a maximum ratio between neutron and gamma sensitivities if the insulation layer that surrounds the emitter is given a thickness such that the amount of insulator is in the range 70–140 mg./cm.$^2$. The unit mg./cm.$^2$ indicates the weight in milligrams of 1 cm.$^2$ of the insulator layer. For a specific insulator material the insulator thickness in centimeters will be obtained by dividing the amount of insulator in mg./cm.$^2$ by the density of the material in question in mg./cm.$^3$.

The emitter is suitably rhodium, silver or vanadium and the insulator can be $Al_2O_3$, $Be_2O_3$ or MgO. According to a certain preferred embodiment of the invention the emitter is a vanadium wire having a diameter of 2 mm. and being surrounded by an insulator layer of $Al_2O_3$ having a thickness of 0.25 mm., which insulator in turn is surrounded by a collector of stainless steel having a thickness of 0.25 mm.

The significance of the insulator layer thickness for the properties of a beta emission neutron detector appears from the following conditions. Beta particles from neutron-induced radioactivity in the emitter have to be transmitted through the insulator in order to contribute to the detector current. The thickness of the insulator obviously has to be less than the maximum range of the beta particles and preferably even less than the average range. Gamma radiation may contribute to the detector current if it causes ejection of high-energy electrons from the emitter. If the gamma-induced current were to be kept small most of these high-energy electrons would be absorbed in the insulator and for this result a certain minimum insulator thickness is required.

The most favourable conditions for having high neutron sensitivity and at the same time low gamma sensitivity were determined from experiments carried out in a nuclear reactor. Insulator materials considered were aluminium oxide, beryllium oxide and magnesium oxide. For aluminium oxide which has a density of 3.8 g./cm.$^3$ the range 70–140 mg./cm.$^2$ corresponds to an insulator thickness of 0.18–0.36 mm.

The invention will now be more closely described by an example of a preferred embodiment with reference to the appended drawing, which shows an axial section through a neutron detector according to the invention.

The neutron detector generally indicated 1 shown in the drawing comprises an emitter 3 consisting of a 2.0 mm. vanadium wire which is surrounded by an insulator 5 consisting of $Al_2O_3$ having a thickness of 0.25 mm., the insulator 5 in turn being surrounded by a collector 7 consisting of a 0.25 mm. sleeve of stainless steel. The sleeve 7 is at one end thereof closed by an end wall 9 attached by welding.

At the other end of the detector unit 1 there is connected a coaxial cable 11 which comprises an outer shell 13 of Inconel surrounding a body of insulating material 15 of $Al_2O_3$ containing two mutually insulated leads 17, 19, one lead 17 of which is connected to the emitter 3 by soldering. The coaxial cable 11 is connected to the collector sleeve 7 by a bushing 23 surrounding the cable 11 and being inserted into the sleeve 7, said bushing being attached by soldering or welding. At its other end the cable 11 is connected to an instrument not shown for measuring the current intensity.

The function of the detector is briefly the following. The vanadium wire consists in greater part in the isotope $V^{51}$ which, when neutron irradiated, gives the isotope $V^{52}$. This isotope decays with a half-life of 3.76 minutes by emission of $\beta$-radiation. The fraction of the $\beta$-radiation reaching or passing through the collector gives rise to an electric current which can be read directly and is a measure of the neutron flux density, the current density being proportional to the neutron flux density.

As mentioned above the coaxial cable 11 is provided with two interior leads, only one of which is connected to the emitter. Gamma radiation and neutrons may induce currents in the cable leads. These currents have the same size in the two leads. Thus by having a cable with two identical leads and using the difference between the currents in the two leads as signal, the cable-induced contribution is compensated for.

The invention is of course not limited to the embodiment described herein but a plurality of embodiments are conceivable. Thus the materials of the different parts of the detector can be varied and instead of the described coaxial arrangement of the parts of the detector a plate assembly is conceivable consisting of plates of the respective parts arranged in the sequence emitter-insulator-collector-insulator-emitter-insulator-collector, etc. The emitter and the collector can also change position, the inner electrode being negatively charged.

What is claimed is:

1. A neutron detector for use in measuring neutron flux densities, comprising an emitter selected from a group consisting of rhodium, silver and vanadium, which emitter when neutron irradiated gives a radioactive substance decaying by emission of $\beta$-radiation, a collector and an insulator layer between the emitter and the collector, the thickness of said insulator layer being such that the layer weighs from about 70 to about 140 mgs. per cm.$^2$, the $\beta$-radiation producing an electric potential between said emitter and said collector.

2. A neutron detector according to claim 1, in which the emitter is a vanadium wire having a diameter of 2 mm., which wire is surrounded by an insulator layer of $Al_2O_3$ having a thickness of 0.25 mm., which insulator in turn is surrounded by a collector of stainless steel having a thickness of 0.25 mm.

References Cited

UNITED STATES PATENTS

| | | | |
|---|---|---|---|
| 3,029,343 | 4/1962 | Reiffel | 313—61 |
| 3,035,173 | 5/1962 | Koch | 313—61 |
| 3,075,116 | 1/1963 | Coliner | 313—61 |
| 3,259,745 | 7/1966 | Garlick | 250—83.1 |

JAMES W. LAWRENCE, *Primary Examiner.*

R. L. JUDD, *Assistant Examiner.*